United States Patent [19]
Yamamoto

[11] Patent Number: 6,041,194
[45] Date of Patent: Mar. 21, 2000

[54] POSITION ADJUSTING DEVICE

[75] Inventor: Yasuhiro Yamamoto, Tokyo, Japan

[73] Assignee: Asahi Kogaku Kogyo Kabushiki Kaisha, Tokyo, Japan

[21] Appl. No.: 08/842,876

[22] Filed: Apr. 17, 1997

[30] Foreign Application Priority Data

Apr. 18, 1996 [JP] Japan ................... P08-121110

[51] Int. Cl.$^7$ .................................................. G03B 19/00
[52] U.S. Cl. ........................................................ 396/429
[58] Field of Search .......................... 396/30, 429–430, 396/315, 320

[56] References Cited

U.S. PATENT DOCUMENTS

| | | |
|---|---|---|
| 4,489,351 | 12/1984 | D'Alayer De Costemore D'Arc .. 358/213 |
| 4,693,548 | 9/1987 | Tsunoi ................... 350/96.13 |
| 4,945,423 | 7/1990 | Takanashi et al. ........ 358/300 |
| 5,294,990 | 3/1994 | Aoki ........................ 348/363 |
| 5,424,156 | 6/1995 | Aoki et al. . |
| 5,589,952 | 12/1996 | Sato et al. .............. 358/487 |
| 5,631,700 | 5/1997 | Sato . |
| 5,646,927 | 7/1997 | Shimizu et al. ............ 369/99 |

FOREIGN PATENT DOCUMENTS 5-2280  1/1993  Japan .

*Primary Examiner*—Safet Metjahic
*Assistant Examiner*—John Chizmar
*Attorney, Agent, or Firm*—Greenblum & Bernstein, P.L.C.

[57] ABSTRACT

A position adjusting device is provided in an electro-developing type camera using an electro-developing recording medium by which an image is electronically developed. The electro-developing recording medium has first, second, and third recording areas in which green, red, and blue images are recorded, respectively. The electro-developing recording medium is supported by a recording medium supporting member through a piezoelectric transducer. The recording medium supporting member and the electro-developing recording medium are moved upward and downward by rotating a drive screw, so that one of the first, second, and third recording areas is positioned in the optical path of the photographing optical system. The position of the electro-developing recording medium is adjusted in a horizontal direction by extending and contracting the piezoelectric transducer.

20 Claims, 8 Drawing Sheets

POSITION ADJUSTING DEVICE

BACKGROUND OF THE INVENTION

1. Field of the Invention

The present invention relates to a recording medium by which an image formed on the recording medium is electronically developed. More particularly, to a device for adjusting a relative, position of images recorded on the recording medium.

2. Description of the Related Art

Conventionally, as disclosed in Japanese Unexamined Patent Publication No. 5-2280 and U.S. Pat. No. 5,424,156, there is known a photographic material which is directly and electronically developed so that the developed visible image can be immediately obtained. In this specification, such a recording medium is referred to as an electro-developing recording medium, and an electronic still camera using the electro-developing recording medium is referred to as an electro-developing type camera.

The electro-developing recording type camera may be constructed in such a manner that R (red), G (green), and B (blue) images can be recorded in the electro-developing recording medium, so that a natural color image can be obtained. These color images are reproduced and superimposed on one another to indicate an image having a natural color on a surface of a display device.

If the relative position of each of R, G, and B images recorded on the electro-developing recording medium is shifted with respect to each other, a color shift occurs on the displayed image, and thus a natural color image cannot be obtained.

SUMMARY OF THE INVENTION

Therefore, an object of the present invention is to provide a device by which relative positions of a plurality of color images recorded on the electro-developing recording medium are adjusted so that a natural color image can be obtained.

According to the present invention, there is provided a device for adjusting a position of an electro-developing recording medium in which an object image formed by a photographing optical system is electronically developed, the electro-developing recording medium having a plurality of recording areas in which color images corresponding to the object image are recorded, the device comprising a recording medium moving mechanism, and an adjusting mechanism.

The recording medium moving mechanism moves the electro-developing recording medium to a position where one of the recording areas is positioned in the optical path of the photographing optical system. The adjusting mechanism adjusts a position of the electro-developing recording medium so that a relative position of the object image formed by the photographing optical system with respect to each of the recording areas coincides with each other.

Further, according to the present invention, there is provided a device for adjusting a recording position of an electro-developing recording medium in which an object image formed by a photographing optical system is electronically developed, the electro-developing recording medium has a plurality of recording areas in which color images corresponding to the object image are recorded, the device comprising a recording medium moving mechanism, a forming mechanism, and an adjusting mechanism.

The recording medium moving mechanism moves the electro-developing recording medium to the recording position where one of the recording areas is positioned in the optical path of the photographing optical system. The forming mechanism forms a positioning mark on the electro-developing recording medium when each of the color images is recorded in each of the recording areas, the positioning mark indicating a relative position of each of the color images formed in the recording areas. The adjusting mechanism adjusts one of the forming mechanism and the recording medium positioned by the recording medium moving mechanism in such a manner that a relative position of the positioning mark with respect to each of the recording areas becomes constant.

Furthermore, according to the present invention, there is provided a device for adjusting a position of an electro-developing recording medium in which an object image formed by a photographing optical system is electronically developed, and the electro-developing recording medium has a plurality of recording areas in which color images corresponding to the object image are recorded, where the device comprises a positioning mechanism and an adjusting mechanism.

The positioning mechanism moves the electro-developing recording medium by a first amount to a position where one of the recording areas is positioned in the optical path of the photographing optical system. The adjusting mechanism moves the electro-developing recording medium by a second amount, smaller than the first amount, to adjust the position of the electro-developing recording medium so that a relative position of the object image formed by the photographing optical system with respect to each of the recording areas coincides with each other.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
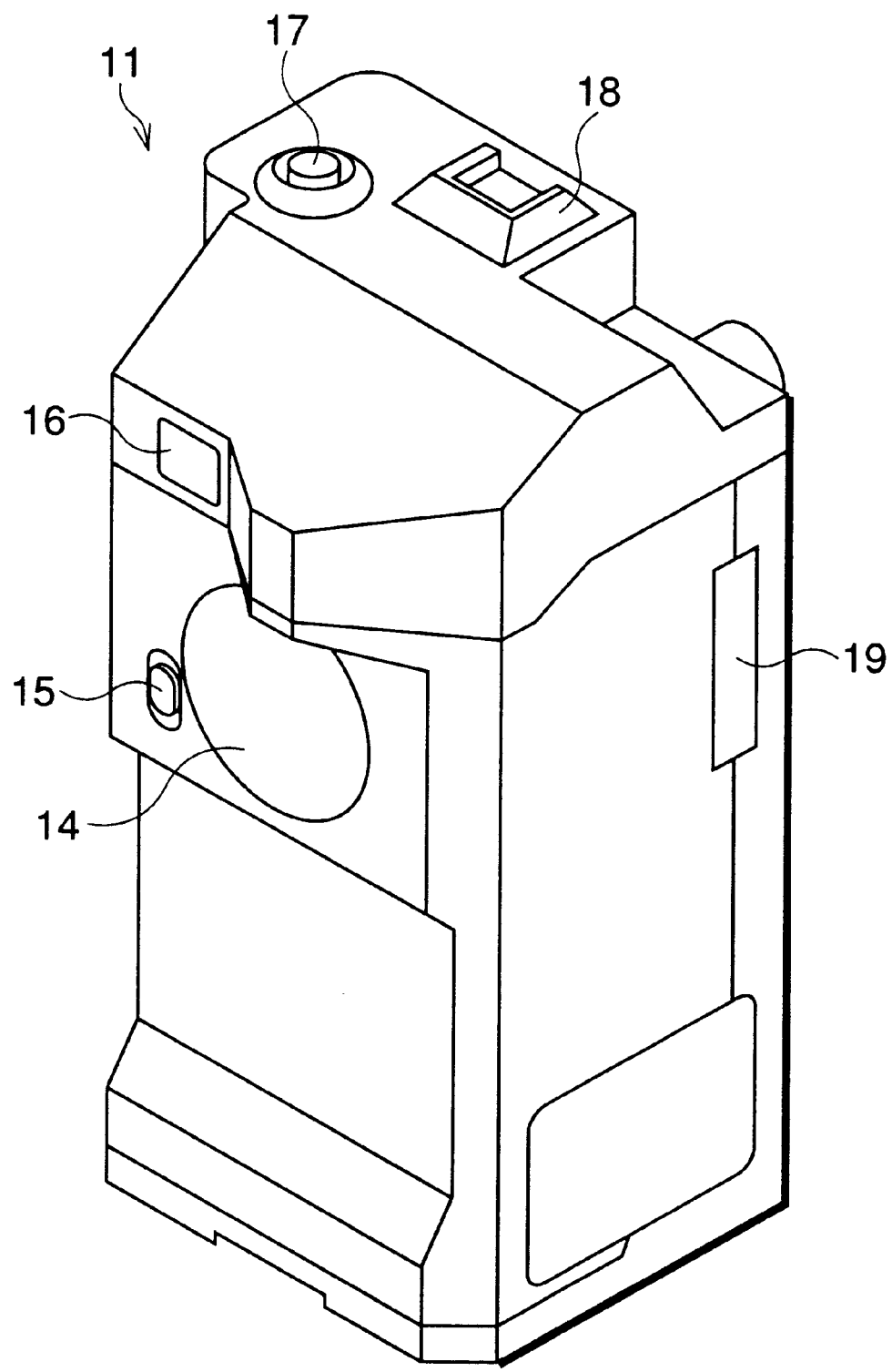
FIG. 1 is an external view showing an electro-developing type camera to which a first embodiment of the present invention is applied.

FIG. 1 is an external view of an electro-developing type camera to which a first embodiment according to the present invention is applied.

When viewing a camera body 11 from the front side, a lens mount 14 provided for attaching an interchangeable lens is located approximately at the center portion of the front surface of the camera body 11. A removal button 15 is provided next to the lens mount 14 so that the interchangeable lens can be removed from the lens mount 14 by pushing the removal button 15. A white balance adjusting window 16 is disposed on the left of, and above the lens mount 14.

On the upper surface of the camera body 11, a flash attachment 18 on which an electronic flash can be attached is provided, and a release button 17 is provided proximate to the flash attachment 18.

A communication connector 19 is provided on a side surface of the camera body 11, so that image data can be transmitted from the camera to an external computer (not shown) or other external peripheral device. A slot (not shown) is formed on a bottom surface, so that an electro-developing recording medium can be inserted into or ejected from the camera body 11.

Figure 2:
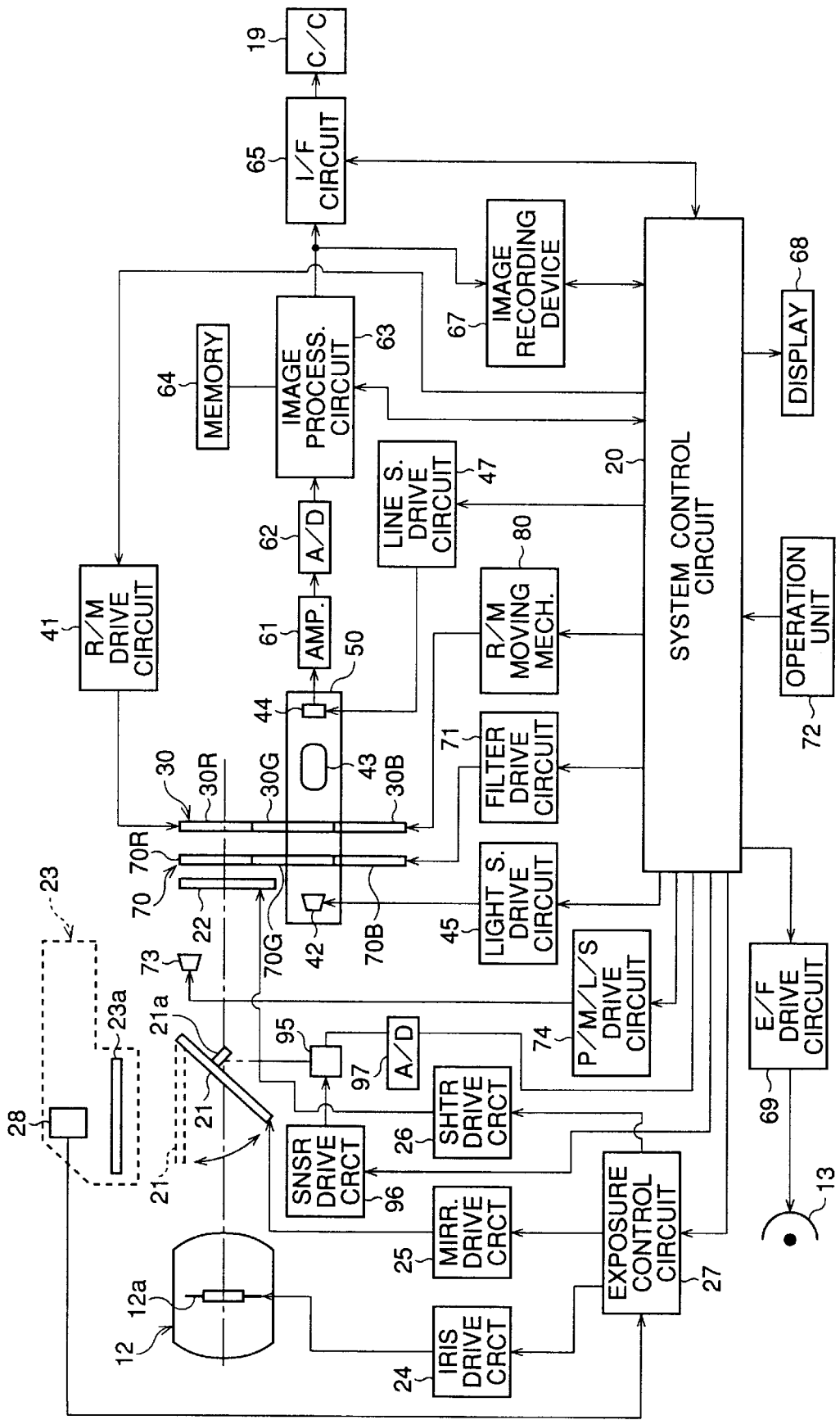
FIG. 2 is a block diagram of the electro-developing type camera shown in FIG. 1.

FIG. 2 is a block diagram of the electro-developing type camera, in which a system control circuit 20 including a microcomputer is mounted to control the electro-developing type camera as a whole.

The photographing optical system 12 has a plurality of lens groups and an aperture 12a. An electro-developing recording medium 30 is disposed behind the photographing optical system 12. A color filter (e.g., dichroic filter) 70 is provided in front of the electro-developing recording medium 30. A quick return mirror 21 is placed between the photographing optical system 12 and the color filter 70. A shutter 22 is provided between the quick return mirror 21 and the color filter 70. A focusing glass 23a included in a view-finder optical system 23 is disposed above the quick return mirror 21. A photometry sensor 28 is disposed in the view-finder optical system 23 to sense the amount of light that is incident to the photographing optical system 12.

The electro-developing recording medium 30 has a first, a second, and a third recording area 30R, 30G, and 30B, respectively, and each area corresponds to the size of one frame's worth of an image. The color filter 70 has an R (red) filter element 70R, a G (green) filter element 70G, and a B (blue) filter element 70B, each having the same size as the recording areas 30R, 30G, and 30B, i.e., corresponding to one image frame.

The aperture 12a, the quick return mirror 21, and the shutter 22 are driven by an iris drive circuit 24, a mirror drive circuit 25, and a shutter drive circuit 26, respectively, which are controlled by an exposure control circuit 27.

The exposure control circuit 27 is operated in accordance with a command signal outputted by the system control circuit 20. Namely, when an exposure is controlled, the degree of opening of the aperture 12a is adjusted by the iris drive circuit 24 under control of the exposure control circuit 27 based on an output signal of a photometry sensor 28.

The quick return mirror 21 is usually positioned in a down position (an inclining position shown by the solid line in the drawing), so that a light beam passing through the photographing optical system 12 is directed to the view-finder optical system 23 to form an object image on the focusing glass 23a. Thus an object to be photographed can be observed by the photographer through the finder optical system (not shown). When a photographing operation is carried out, the quick return mirror 21 is rotated upwards by the mirror drive circuit 25 and set to an up position (a horizontal position shown by the broken line in the drawing), so that the light beam is directed to the electro-developing recording medium 30.

The shutter 22 is usually closed, but upon a photographing operation, the shutter 22 is opened for a predetermined period of time by the shutter drive circuit 26 under the control of the exposure control circuit 27. Thus the light beam passing through the photographing optical system 12 enters a light receiving surface of the electro-developing recording medium 30, thus forming a two-dimensional image thereon.

An electric voltage (i.e., a recording medium activating signal) is applied to the electro-developing recording medium 30 under the control of a recording medium drive circuit 41. By exposing the electro-developing recording medium 30 while applying the voltage, an image formed by the photographing optical system 12 is developed on the electro-developing recording medium 30 as a visible image. Note that the recording medium drive circuit 41 is operated in accordance with a command signal outputted by the system control circuit 20.

A support member 50, which is fixed to a fixed frame (not shown), is provided close to the shutter 22. A main light source 42, a scanner optical system 43, and a line sensor 44 are supported by the support member 50. The main light source 42 has a plurality of LED (photodiodes). The line sensor 44 may be a one-dimensional CCD sensor of 2000 pixels, for example. The line sensor 44 may be of suitable length to completely cover and extend over one horizontal scanning line of the image formed on the electro-developing recording medium 30. The line sensor 44 serves as a photoelectric-conversion device, which converts an optical image to an electric signal. The scanner optical system 43 is disposed between the light source 42 and the line sensor 44. The light source 42, the scanner optical system 43, and the line sensor 44 are arranged in parallel to the optical axis of the photographing optical system 12.

The color filter 70 and the electro-developing recording medium 30 can be moved in a direction perpendicular to the optical axis of the photographing optical system 12. The color filter 70 and the electro-developing recording medium 30 are moved by a filter drive mechanism 71 and a recording medium moving mechanism 80, respectively.

In a photographing operation, the color filter 70 and the electro-developing recording medium 30 are moved as one, so that the centers of the R filter element 70R and the first recording area 30R, the centers of the G filter element 70G and the second recording area 30G, or the centers of the B filter element 70B and the third recording area 30B are positioned on the optical axis of the photographing optical system 12. Namely, R, G, and B images are recorded in the first, second, and third recording areas 30R, 30G, and 30B, respectively.

When an image recorded on the electro-developing recording medium 30 is read, the color filter 70 is fixed at a position to retreat from the support member 50, i.e., the side of the shutter 22, for example. In this state, each of the recording areas 30R, 30G, and 30B is moved between the light source 42 and the scanner optical system 43 in a direction perpendicular to the optical axis of the scanner optical system 43. Namely, the image recorded on the electro-developing recording medium 30 is illuminated by the light source 42 and formed on the light receiving surface of the line sensor 44, through an operation of the scanner optical system 43.

Control of the light source 42 (e.g., turning ON and OFF) is performed by a light source drive circuit 45. Control of the reading operation of pixel signals generated in the line sensor 44 is carried out by a line sensor drive circuit 47. The circuits 45 and 47 are controlled by the system control circuit 20.

Pixel signals read out from the line sensor 44 are amplified by an amplifier 61, and converted to a digital signal by an A/D converter 62. The digital pixel signals are subjected to a shading correction, a gamma correction, and so on by an image processing circuit 63 under the control of the system control circuit 20, and then temporarily stored in a memory 64. The memory 64 includes an EEPROM in which correction data for the shading correction are stored. Note that the memory 64 may have a storage capacity equal to one horizontal scanning line outputt from the line sensor 44, or may have a storage capacity to store of one frame of pixel signals.

The pixel signals read from the memory 64 are inputted to an interface circuit 65 through the image processing circuit 63, so that the pixel signals are subjected to a predetermined process such as a format conversion, and can then be output to an external computer (not shown) through the communication connector 19. The pixel signals outputted from the image process circuit 63 are subjected to a predetermined process such as an image compression and a format conversion in a recording device control circuit (not shown), so that the pixel signals can be recorded on a recording medium such as an IC memory card, for example, in an image recording device 67. The interface circuit 65 and the image recording device 67 are operated in accordance with a command signal outputted from the system control circuit 20.

An operation unit 72 including the release button 17, a scan start switch, and so on is connected to the system control circuit 20. A photographing operation (i.e., a recording operation), in which an image is recorded on the electro-developing recording medium 30, and a reading operation, in which the image is read from the electro-developing recording medium 30, are performed by operating the operation unit 72. A display device 68 is connected to the system control circuit 20 to indicate various setting conditions of the electro-developing type camera. Further, an electric flash drive circuit 69 is connected to the system control circuit 20 to control the flash operation of the electronic flash 13.

An area sensor 95, which is composed of a charge coupled device (CCD), for example, is provided so that the relative position of an image recorded in each of the recording areas 30R, 30G, and 30B is optically sensed. The area sensor 95 is located under a sub-mirror 21a attached on a rear surface of the quick return mirror 21, a front surface of which faces the photographing optical system 12 when the quick return mirror 21 is in the down position. The quick return mirror 21 is a half mirror so that a light beam passing through the photographing optical system 12 is led to the sub-mirror 21a. The area sensor 95 is controlled by a sensor drive circuit 96, so that a part of the object image obtained by the photographing optical system 12 is formed on the area sensor 95.

The area sensor 95 and the electro-developing recording medium 30 are provided at positions which are optically equivalent to each other. Namely, the optical length from the sub-mirror 21a to the area sensor 95 is equal to the optical length from the rear surface of the quick return mirror 21 to the image recording area 30R, 30G, or 30B which is positioned on the optical axis of the photographing optical system 12. A sub-image sensed by the area sensor 95 corresponds to approximately the center of the object image recorded in each of the recording areas 30R, 30G, and 30B, and the sub-image is a piece positioned at the center of 3×3 matrix of the object image, for example. Namely, the area of the sub-image is approximately 1/10 of the object image.

The image signal obtained by the area sensor 95 is converted to a digital signal by an A/D converter 97, and is subjected to a predetermined process by the system control circuit 20. Namely, in the system control circuit 20, a position shift of the image obtained by the photographing optical system 12 is detected based on the image signal outputt from the A/D converter 97. Thus the position of the electro-developing recording medium 30 is adjusted by controlling a piezoelectric transducer as described later.

Each of the R, G, and B images read from the electro-developing recording medium 30 are superimposed on one another, so that an image having a natural color is reproduced on a computer display monitor, for example. In this operation, the relative position of each of the R, G, and B images should be adjusted with respect to one another. Therefore, in the photographing operation, a positioning mark indicating the relative position of each of the R, G, and B images is recorded in a portion beside each of the recording areas 30R, 30G, and 30B. A positioning mark light source 73 is provided for forming purposes at a portion close to a surface of the shutter 22, which surface faces the photographing optical system 12. Namely, the positioning mark light source 73 emits a light beam by which the electro-developing recording medium 30 is illuminated so that a transmittance thereof is changed whereby the positioning marks are recorded. Control of the light source 73 (e.g. turning ON and OFF) is performed by a positioning mark light source drive circuit 74, which is operated based on a command signal output by the system control circuit 20.

Figure 3:
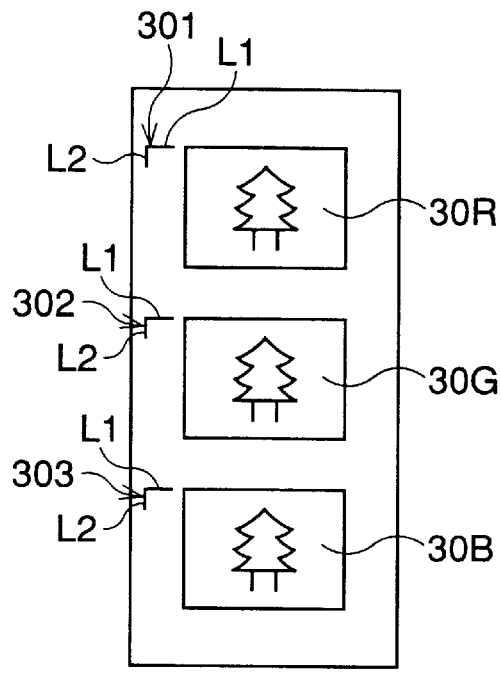
FIG. 3 is a front view showing an electro-developing recording medium.

FIG. 3 shows the electro-developing recording medium 30. The electro-developing recording medium 30 is a rectangular plate, and is provided with the first, second, and third recording areas 30R, 30G, and 30B which are arranged vertically on the electro-developing recording medium 30. In the electro-developing recording medium 30 which has been recorded, positioning marks 301, 302, and 303 are formed at a portion close to the left corners of the first, second, and third recording areas 30R, 30G, and 30B, respectively.

The positioning mark 301 is L-shaped, and has a first linear portion L1, which extends horizontally from the upper end portion of the first recording area 30R, and a second linear portion L2, which is perpendicular to the first linear portion L1. Namely, the first linear portion L1 is parallel to the longitudinal axis of the line sensor 44. The breadth of the first linear portion L1 is approximately 30 μm, for example, which is larger than the diameter (approximately 7 μm, for example) of a photodiode provided in the line sensor 44.

The positioning marks 302 and 303 corresponding to the second and third recording areas 30G and 30B have the same constructions as the positioning mark 301. Namely, each of the positioning marks 302 and 303 has the first linear portion L1, which extends horizontally from the upper end portion of the second and third recording area 30G and 30B, respectively, and a second linear portion L2, which is perpendicular to the first linear portion L1.

Figure 4:
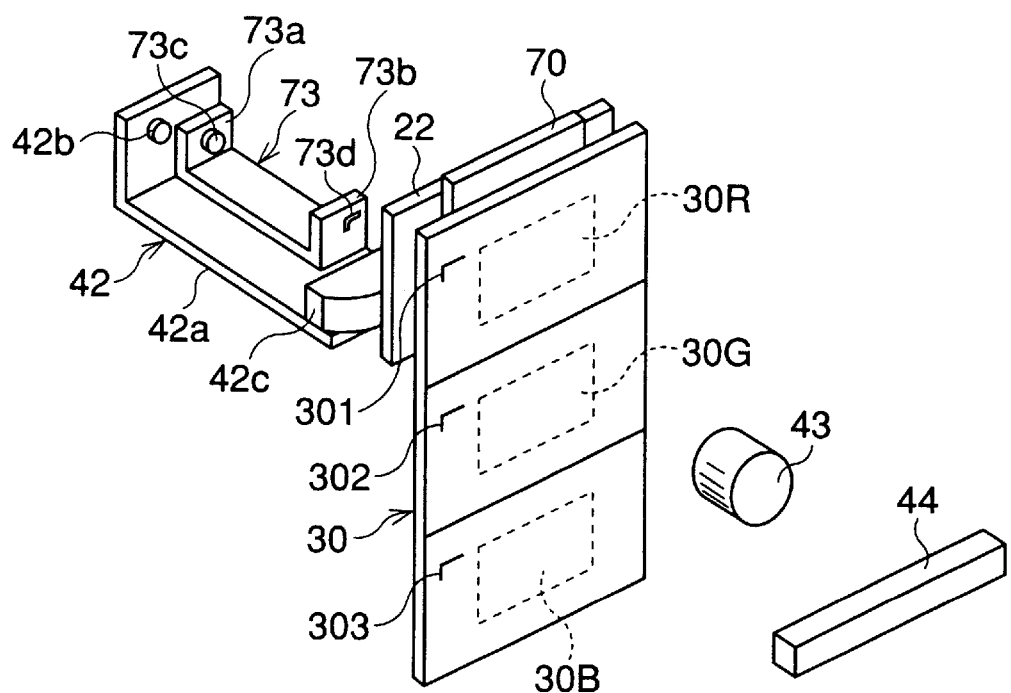
FIG. 4 is a perspective view showing constructions of a main light source and a positioning mark light source.

FIG. 4 shows the construction of the main light source 42 and the positioning mark light source 73. The main light source 42 has a support frame 42a, an LED 42b, and a lens 42c. The LED 42b and the lens 42c are attached to the support frame 42a, and a light emitted by the LED 42b enters the lens 42c. The illumination light passing through the lens 42c appears as a linear strip extending in a horizontal direction for each of the recording areas 30R, 30G, and 30B. This illumination light is a parallel light beam, which passes through the electro-developing recording medium 30, and is condensed on the light receiving surface of the line sensor 44 by the scanner optical system 43.

The positioning mark light source 73 is located above the main light source 42. The positioning mark light source 73 has a support frame with a pair of flanges 73a and 73b. An LED 73c is attached to the first flange 73a, and an L-shaped slit 73d is formed in the second flange 73b. A light outputted by the LED 73c passes through the slit 73d, and is radiated onto a portion close to either one of the recording areas 30R, 30G, or 30B, through outside of the shutter 22. Although the emitted light of the LED 73c is a diffuse light, the emitted light has high directivity, and a sharpness of an outline of the recorded positioning mark is of such a degree that a practical problem does not occur. Note that, in a state shown in FIG. 4, the main light source 42 is positioned so that the lens 42c faces the upper end of the second recording area 30G, and the positioning mark light source 73 is set to face a portion close to a corner of the first recording area 30R.

In the initial state of the photographing operation, as shown in FIGS. 2 and 4, the R filter element 70R and the first recording area 30R are positioned on the optical axis of the photographing optical system 12, i.e., behind the shutter 22. In this state, by opening and closing the shutter 22, an R image is recorded on the first recording area 30R. Further, in this recording operation, the positioning mark 301 is recorded on the upper side end of the first recording area 30R by the operation of the positioning mark light source 73.

When the recording operation ends, the color filter 70 and the electro-developing recording medium 30 are moved upward as a unit, so that the G filter element 70G and the second recording area 30G are set to positions behind the shutter 22. Thus, a G image is recorded in the second recording area 30G, and the positioning mark 302 is recorded on a side portion of the upper end of the second recording area 30G.

Then, the color filter 70 and the electro-developing recording medium 30 are moved upward again, so that the B filter element 70B and the third recording area 30B are set to portions behind the shutter 22. Thus, a B image is recorded in the third recording area 30B, and the positioning mark 303 is recorded in a side portion of the upper end of the third recording area 30B.

The position where the positioning mark light source 73 is located is adjusted so that each of the positioning marks 301, 302, and 303 substantially coincides with a reading start position where the line sensor 44 starts to read each of the images recorded in the recording areas 30R, 30G, and 30B. Further, the position where the positioning mark light source 73 is attached is the initial position where a reading operation of the electro-developing recording medium 30 is started.

Figure 5:
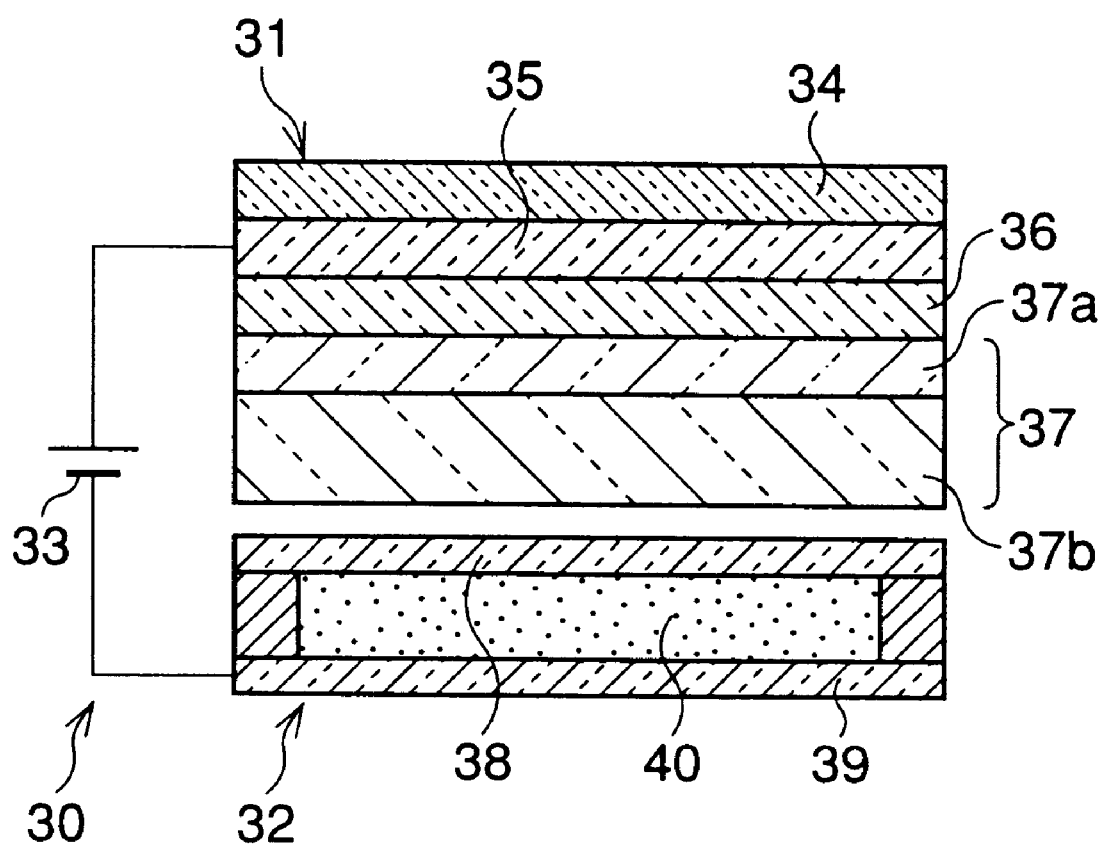
FIG. 5 is a sectional view showing a structure of an electro-developing recording medium.

FIG. 5 shows a structure of the electro-developing recording medium 30, and is the same as that shown in Japanese Unexamined Patent Publication No. 5-2280.

The electro-developing recording medium 30 has an electrostatic information recording medium 31 and an electric charge storage medium 32, and an electric voltage is applied thereto by an electric power source 33. The electrostatic information recording medium 31 is formed by laminating a glass base plate 34, an electrode layer 35, an inorganic oxide material layer 36 and a photoconducting layer 37, and the photoconducting layer 37 is formed by laminating an electric charge generating layer 37a and an electric charge transferring layer 37b. The electric charge storage medium 32 is formed by confining liquid crystal 40, which is a smectic liquid crystal, between a liquid crystal supporting plate 38 and a liquid crystal electrode layer 39. The electric charge transferring layer 37b of the photoconducting layer 37 and the liquid crystal supporting plate 38 of the electric charge storage medium 32 face each other with a small gap therebetween.

An ON-OFF condition of the electric power source 33 is controlled by the recording medium drive circuit 41 (see FIG. 2). When the electric power source 33 is turned ON, an electric voltage is applied between the electrode layer 35 and the liquid crystal electrode layer 39, i.e., between the electrostatic information recording medium 31 and the electric charge storage medium 32. When the electrostatic information recording medium 31 is exposed while the electric voltage is applied, an electric charge is generated in the electrostatic information recording medium 31 in accordance with an image formed thereon. Since the intensity of the electric field applied to the liquid crystal 40 is changed in accordance with the electric charge, the image is indicated on the liquid crystal 40 as a visible image, and thus, an image of an object is developed. Namely, the visible image is generated in accordance with the electric charge.

The electric charge storage medium 32 is a liquid crystal display having a memory-type liquid crystal such as a smectic liquid crystal. Thus, the developed visible image is retained even if the electric field is removed. In the liquid crystal, the developed visible image can be erased by heating the liquid crystal, using a heating device (not shown) at a predetermined temperature. In such a case, the same electric charge storage medium 32 can be used repeatedly.

Figure 6:
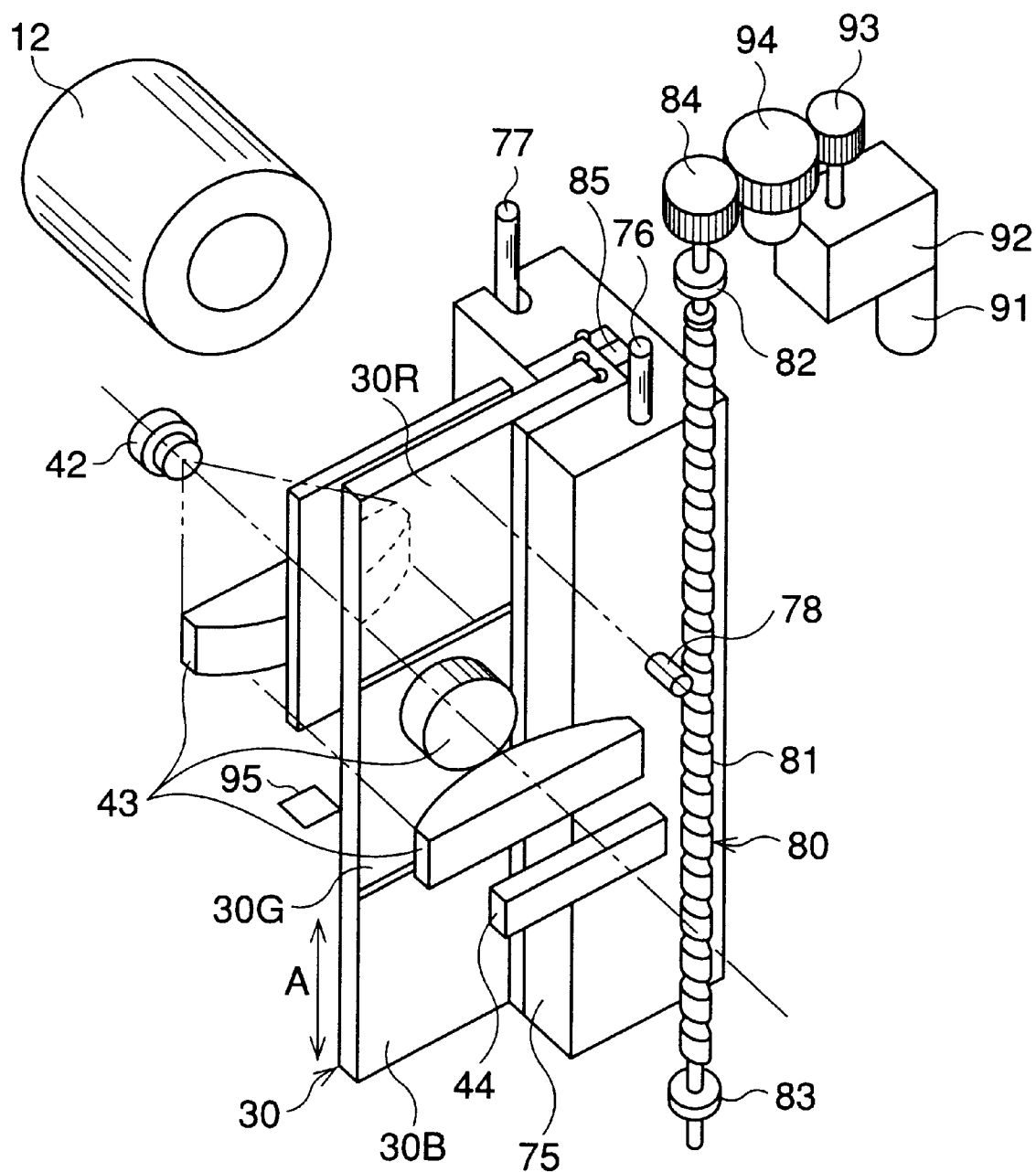
FIG. 6 is a perspective view showing a construction by which the electro-developing recording medium is moved.

FIG. 6 shows a construction by which the electro-developing recording medium 30 is moved. Note that, in this drawing, the color filter 70 is omitted.

The electro-developing recording medium 30 is attached to a recording medium holding member 75. The recording member holding member 75 is movably supported by a pair of shafts 76 and 77, and an engaging pin 78 is fixed to a side surface of the recording medium holding member 75. The recording medium moving mechanism 80 has a drive screw 81 extending in parallel to the side surface of the recording medium holding member 75. The drive screw 81 is supported by a pair of bearings 82 and 83 to rotate about the axis thereof. The engaging pin 78 is engaged with the drive screw 81, so that the recording medium moving mechanism 80 is moved along the axial direction of the drive screw 81 when the drive screw 81 rotates.

A stepping motor 91 moves, in one operation, the electro-developing recording medium 30 by one object image frame, namely the length of the vertical side of each of the recording areas 30R, 30G, and 30B, the length being indicated by reference "A" in FIG. 6. The motor 91 is connected to a reduction gear mechanism 92, and a drive gear 93 provided on the output shaft of the reduction gear mechanism 92 is meshed with an intermediate gear 94. A driven gear 84 is fit on the portion of the drive screw 81 projected from the bearing 82, and is meshed with the intermediate gear 94.

Thus, when the motor 91 is driven, the drive screw 81 is rotated through the reduction gear mechanism 92, the drive gear 93, the intermediate gear 94, and the driven gear 84, so that the electro-developing recording medium 30 is moved upward or downward. The motor 91 is stopped when one of the recording areas 30R, 30G, and 30B is positioned in the optical path of the photographing optical system 12. The stepping motor 91 is driven at a relatively high speed when it moves the electro-developing recording medium 30 by one frame.

On the other hand, the stepping motor 91 is driven by a minute amount at a relatively low speed when the stepping motor 91 is used for adjusting the position of the electro-developing recording medium 30. Namely, the position adjustment of the electro-developing recording medium 30 in the vertical direction of the image recorded in each of the recording areas 30R, 30G, and 30B is carried out by adjusting the degree of rotation of the drive screw 81. In other words, the position of the electro-developing recording medium 30 is adjusted by the stepping motor 91 in a direction parallel to a line, along which the electro-developing recording medium 30 is moved.

A piezoelectric transducer 85 is mounted on the recording medium moving mechanism 80, and is positioned between the electro-developing recording medium 30 and the recording medium holding member 75. The piezoelectric transducer 85 is expanded and contracted in accordance with a control of the system control circuit 20, so that a position of the electro-developing recording medium 30 in the lateral direction of the image recorded in each of the recording areas 30R, 30G, and 30B, namely a direction perpendicular to a line along which the electro-developing recording medium 30 is moved is adjusted. Namely, the position of the electro-developing recording medium 30 set by the motor 91 is adjusted by the piezoelectric transducer 85 in such a manner that the relative position of each of the recording areas 30R, 30G, and 30B with respect to the optical axis of the photographing optical system 12 coincides with each other.

Figure 7:
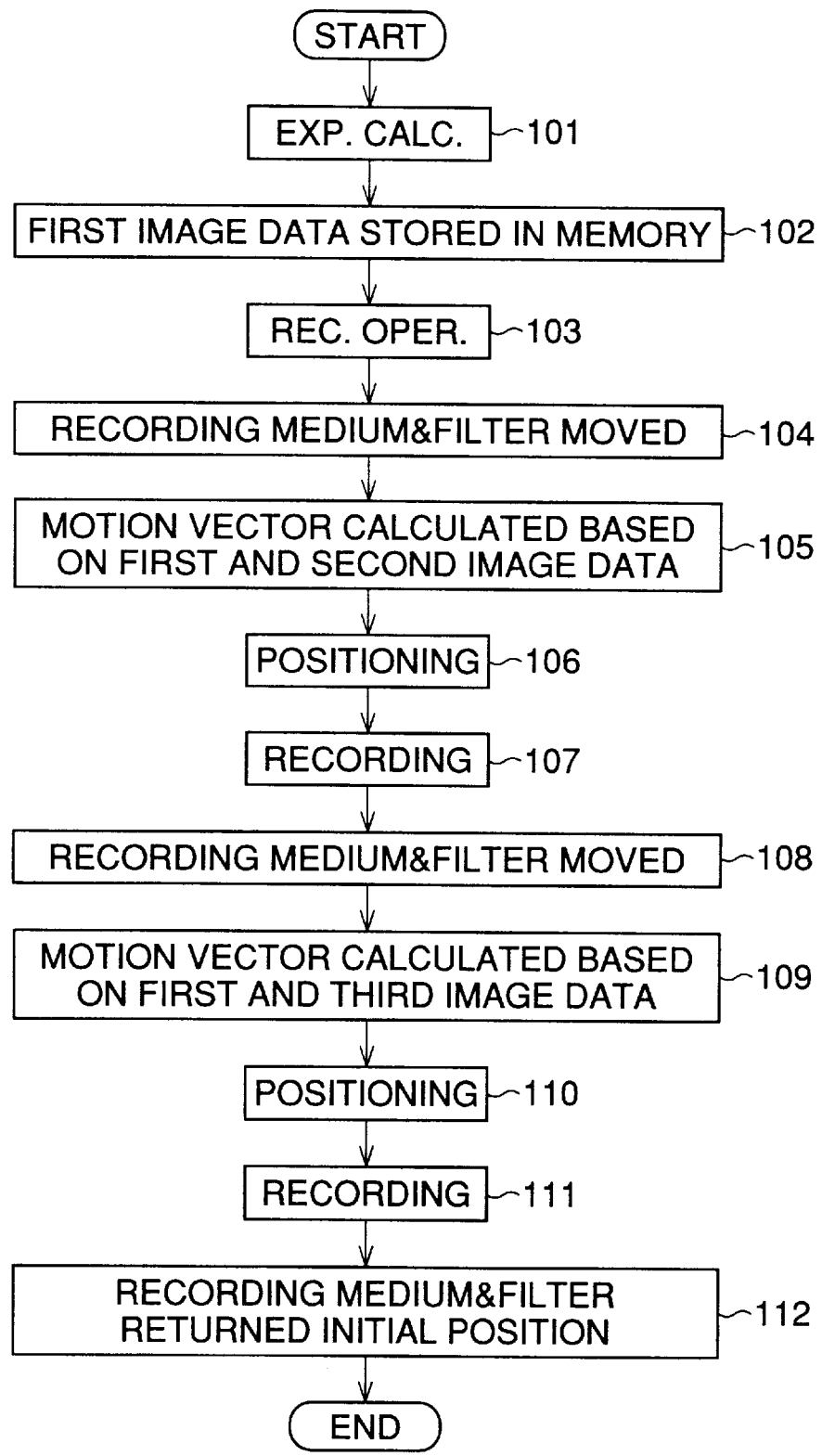
FIG. 7 is a flow chart of a program for performing a photographing operation.

FIG. 7 shows a flow chart of a program for performing the photographing operation. This program is executed when the release button 17 is depressed.

In the initial stage in which this program is started, the centers of the R filter element 70R and the first recording area 30R are positioned on the optical axis of the photographing optical system 12. The quick return mirror 21 is in the down position, so that the light passing through the photographing optical system 12 is reflected by the sub-mirror 21a, and is led to the area sensor 95.

In Step 101, an exposure calculation is carried out based on the photometry value detected by the photometry sensor 28, so that the shutter speed and the aperture value are determined. In Step 102, first image data, i.e., a sub-image sensed by the area sensor 95 is stored in a memory provided in the system control circuit 20. Then, in Step 103, a recording operation is performed, and thus, an R image is recorded in the first recording area 30R.

In Step 104, the electro-developing recording medium 30 and the color filter 70 are moved by one image frame, respectively, so that the centers of the G filter element 70G and the second recording area 30G are set on the optical axis of the photographing optical system 12. In Step 105, second image data sensed by the area sensor 95 is inputted into the system control circuit 20, and thus, a motion vector is calculated based on the difference between the second image data and the first image data stored in the memory. This motion vector is the positional difference between the first and second image data with respect to the optical axis of the photographing optical system 12.

Figure 8A:
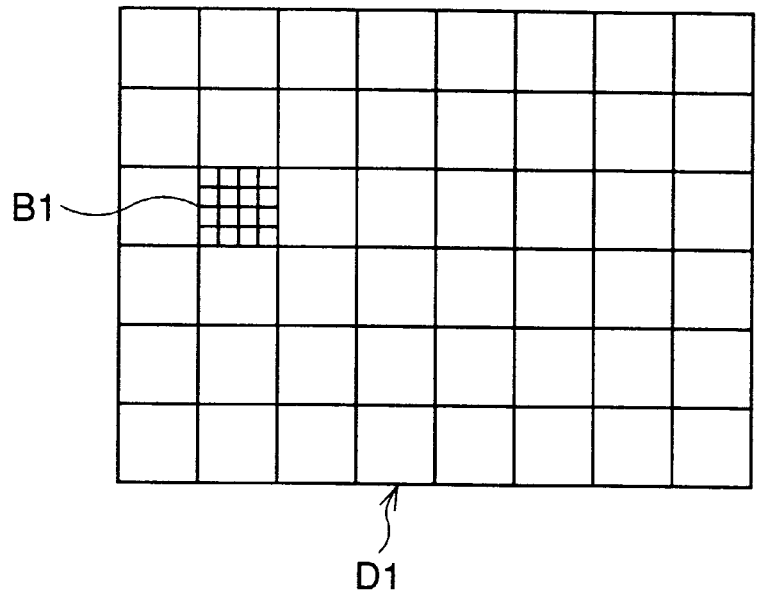
FIGS. 8A and 8B are views showing block divisions of first and second image data.
Figure 8B:
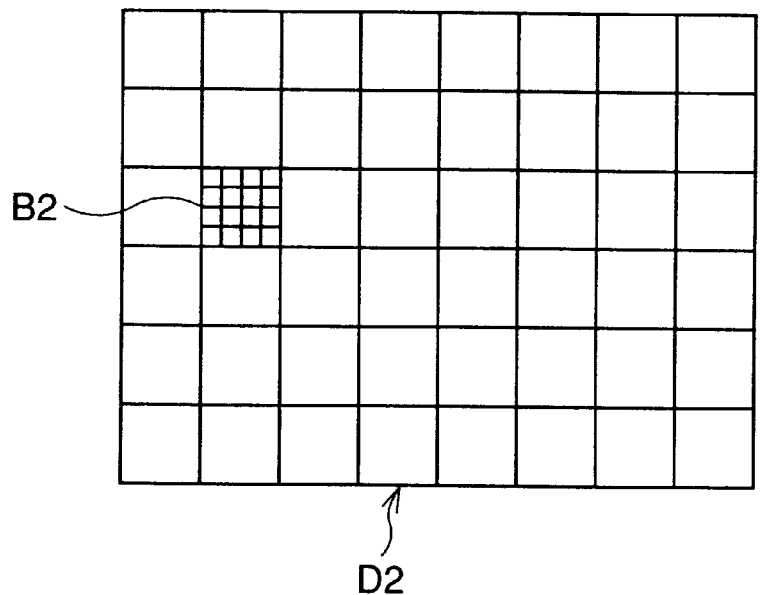

The motion vector is calculated in the system control circuit 20. As shown in FIGS. 8A and 8B, the first and second image data D1 and D2 are divided into a plurality of blocks, respectively, each of blocks being composed of 8×8 pixels, for example. An average value of pixel data is obtained for each of the blocks. It is supposed that the average value of a block included in the first image data D1 is "B1", and the average value of the corresponding block included in the second image data D2 is "B2". The absolute value of the difference between the average values "B1" and "B2" is obtained for all of blocks, and the sum of the absolute values for all of the blocks is obtained. Then, the first and second image data D1 and D2 are relatively shifted by a predetermined amount in the horizontal or vertical direction, and similarly to the above, the sum of the absolute values of the differences is obtained.

The sum obtained in the present step (Step 105) and the sum obtained in the previous step (Step 103) are compared with each other, and thus, the amount of shift in the horizontal and vertical directions of the image data D1 and D2 is obtained so that the sum becomes the minimum. The shift amount and the shift direction correspond to the motion vector. The driven amount of the piezoelectric transducer 75 is determined based on the shift amount in the horizontal direction, and the driven amount of the motor 91 is determined based on the shift amount in the vertical direction.

In Step 106, according to the pattern matching based on the motion vector obtained in Step 105, the piezoelectric transducer 75 and the motor 91 are controlled so that the first image data D1 coincides with the second image data D2, and thus, the horizontal and vertical positions of the electro-developing recording medium 30 are adjusted. As a result, the second recording area 30G is set to the same position as the first recording area 30R with respect to the object image obtained by the photographing optical system 12. In this state, the recording operation is carried out in Step 107, and thus, a G image is recorded in the second recording area 30G.

In Step 108, the electro-developing recording medium 30 and the color filter 70 are both moved by one image frame of, so that the centers of the B filter element 70B and the third recording area 30B are set on the optical axis of the photographing optical system 12. In Steps 109 through 111, similar to Steps 105 through 107, the horizontal and vertical positions of the electro-developing recording medium 30 are compensated based on the first and third image data, a B image is recorded in the third recording area 30B in a state in which the third recording area 30B is set on the optical axis of the photographing optical system 12.

In Step 112, the electro-developing recording medium 30 and the color filter 70 are returned to the initial positions in which the electro-developing recording medium 30 and the color filter 70 were set before the recording operation was started, and this program ends.

As described above, in this embodiment, the relative positions of the R, G, and B images recorded on the electro-developing recording medium 30 coincide with each other. Therefore, the process in which these images are superimposed on each other becomes simple, and thus, a clear color image without a color drift can be easily obtained on the surface of a display device.

Figure 9:
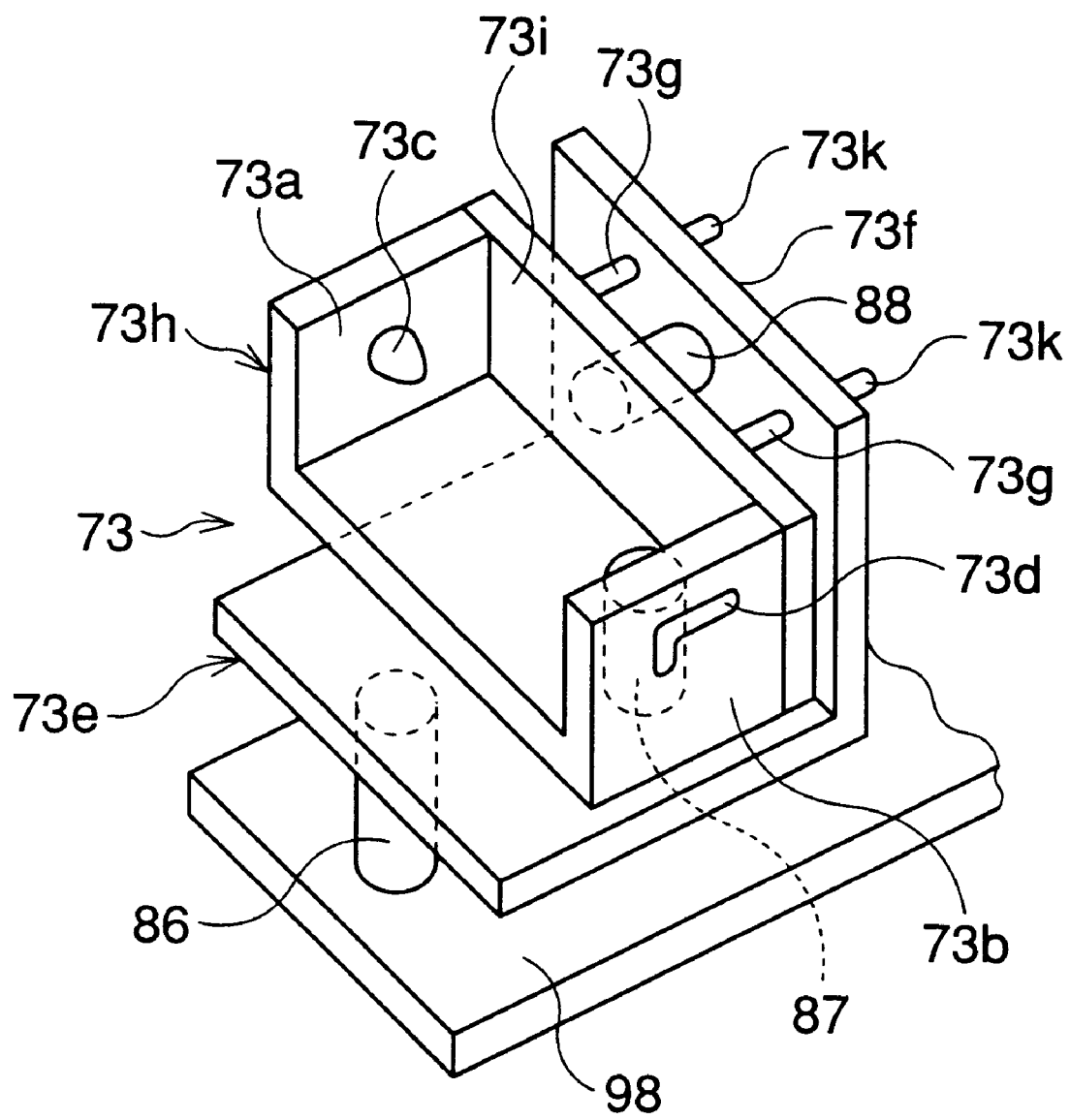
FIG. 9 is a perspective view showing a positioning mark light source provided in the electro-developing type camera to which a second embodiment of the present invention is applied.

FIG. 9 shows a perspective view showing a positioning mark light source 73 provided in the electro-developing type camera to which a second embodiment of the present invention is applied. The other constructions are the same as the first embodiment.

In the second embodiment, for adjusting the relative positions of the images recorded in the recording areas 30R, 30G, and 30B, the electro-developing recording medium 30 is not moved, but positions of the positioning marks 301, 302, and 303 indicating the relative positions of the images recorded in the recording areas 30R, 30g, and 30B are adjusted.

In FIG. 9, a vertical moving member 73e is fixed on an upper surface of a support plate 98 through a pair of piezoelectric transducer 86 and 87, and has an L-shaped section. Namely, the vertical moving member 73c is moved upward and downward by extension and contraction of the piezoelectric transducers 86 and 87. A piezoelectric transducers 88 is attached on a vertical plate 73f of the vertical moving member 73e, and support holes 73g are formed on the side portions of the vertical plate 73f with respect to the piezoelectric transducer 88. A horizontal moving member 73h has a pair of flanges 73a and 73b, and a connecting plate 73i which connects the flanges 73a and 73b and is parallel to the vertical plate 73f. Guide pins 73k slidably supported by the support holes 73g are fixed on the connecting plate 73i, and the piezoelectric transducer 88 is fixed on the connecting plate 73i. An LED 73c is attached to the flange 73a, and an L-shaped slit 73d is formed in the flange 73b.

Therefore, by extending and contracting the piezoelectric transducers 86 and 87, the vertical moving member 73e and the horizontal moving member 73h are displaced in up and down directions relative to the support plate 98, so that the LED 73c and the slit 73d are displaced in the up and down directions. By extending and contracting the piezoelectric transducer 88, the horizontal moving member 73h is displaced in a horizontal direction relative to the vertical moving member 73e, so that the LED 73c and the slit 73d are displaced in the horizontal direction.

Namely, in the embodiment, the piezoelectric transducers 86, 87, and 88 are controlled in accordance with the motion vector between the first and third image data obtained by the area sensor 95 (see FIGS. 2 and 6), so that the relative positions of the positioning marks 301, 302, and 303 with respect to the images recorded in the image recording areas 30R, 30G, and 30B can be constant. Therefore, when the image recorded in each of the image recording areas 30R, 30G, and 30B is reproduced, the R, G, and B images can be exactly superimposed, so that a clear color image without a color drift can be obtained.

Note that, in the second embodiment, the piezoelectric transducer 86 and 87 may be omitted, and the drive screw 81 can be constructed so as to adjust the vertical position of the electro-developing recording medium 30.

Further, in the first and second embodiments, a line sensor can be provided instead of the area sensor 95. In this case, the positioning of the image recording areas 30R, 30G, and 30B, or the positioning marks 301, 302, and 303 can be performed with respect to a position corresponding to the longitudinal direction of the line sensor. Furthermore, the line sensor may be operated as an auto-focus adjustment sensor.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 8-121110 (filed on Apr. 18, 1996) which is expressly incorporated herein, by reference, in its entirety.

I claim:

1. A device for adjusting a position of an electro-developing recording medium in which an object image formed by a photographing optical system is electronically developed, said electro-developing recording medium having a plurality of recording areas in which color images corresponding to said object image are sequentially recorded, said color images being obtained by color separating a color image into a plurality of primary color images, said device comprising:

a recording medium moving mechanism which moves said electro-developing recording medium to a position where one of said recording areas is positioned in an optical path of the photographing optical system; and an adjusting mechanism which adjusts a position of said electro-developing recording medium so that a relative position of each of said color images formed by said photographing optical system with respect to each of said recording areas is substantially the same.

2. A device according to claim 1, further comprising a sensing mechanism which senses said relative position with respect to each of said recording areas.

3. A device according to claim 2, wherein said sensing mechanism comprises an area sensor which optically senses at least a portion of said object image.

4. A device according to claim 3, further comprising a main mirror and a sub-mirror, said main mirror having a front surface which faces said photographing optical system, and a rear surface, on which said sub-mirror is attached, said main mirror being a half mirror so that a light beam passing through said photographing optical system is directed to said sub-mirror.

5. A device according to claim 3, wherein said area sensor and said electro-developing recording medium are provided at optically equivalent positions.

6. A device according to claim 3, wherein said area sensor senses a central portion of said object image.

7. A device according to claim 1, wherein said adjusting mechanism adjusts said position in a direction perpendicular to a line along which said recording medium moving mechanism moves said electro-developing recording medium.

8. A device according to claim 1, wherein said adjusting mechanism comprises a piezoelectric transducer.

9. A device according to claim 1, wherein said adjusting mechanism is mounted on said recording medium moving mechanism.

10. The device according to claim 1, said adjusting mechanism moving said electro-developing recording medium in a direction of movement of said recording medium by said moving mechanism and in a direction transverse to said direction of movement of said recording medium by said moving mechanism.

11. A device for adjusting a recording position of an electro-developing recording medium in which an object image formed by a photographing optical system is electronically developed, said electro-developing recording medium having a plurality of recording areas in which color images corresponding to said object image are sequentially recorded, said color images being obtained by color separating a color image into a plurality of primary color images, said device comprising:

a recording medium moving mechanism which moves said electro-developing recording medium to said recording position where one of said recording areas is positioned in the optical path of said photographing optical system;

a forming mechanism which sequentially forms positioning marks on said electro-developing recording medium when each of said color images is recorded in each of said recording areas, said positioning mark indicating a relative position of each of said color images formed in said recording area; and an adjusting mechanism that adjusts one of said forming mechanism and said recording medium positioned by said recording medium moving mechanism in such a manner that a relative position of each of said positioning marks with respect to each of said recording areas becomes constant.

12. A device according to claim 11, further comprising a sensing mechanism which senses a relative position of said object image with respect to each of said recording areas.

13. A device according to claim 12, wherein said sensing mechanism comprises an area sensor which optically senses at least a portion of said object image.

14. A device according to claim 11, wherein said adjusting mechanism adjusts said recording position in a first direction perpendicular to a line along which said recording medium moving mechanism moves said electro-developing recording medium, and in a second direction parallel to said line.

15. A device according to claim 11, wherein said adjusting mechanism comprises a piezoelectric transducer.

16. The device according to claim 11, said adjusting mechanism adjusting a position of said one of said forming mechanism and said recording medium by movement in a direction of movement of said recording medium by said moving mechanism and in a direction transverse to said direction of movement of said recording medium by said moving mechanism.

17. A device for adjusting a position of an electro-developing recording medium in which an object image formed by a photographing optical system is electronically developed, said electro-developing recording medium having a plurality of recording areas in which color images corresponding to said object image are sequentially recorded, said color images being obtained by color separating a color image into a plurality of primary color images, said device comprising:

a positioning mechanism which moves said electro-developing recording medium by a first amount to a position where one of said plurality of recording areas is positioned in an optical path of said photographing optical system; and an adjusting mechanism which adjusts said electro-developing recording medium by a second amount, said second amount being less than said first amount, to adjust the position of said electro-developing recording medium so that a relative position of each of said object images formed by said photographing optical system with respect to each of said recording areas is substantially the same.

18. The device according to claim 17, said adjusting mechanism adjusting a position of said electro-developing recording medium in a direction in which said positioning mechanism moves said electro-developing recording medium and in a direction transverse to said direction in which said positioning medium moves said electro-developing recording medium.

19. The device for adjusting the device according to claim 17, wherein said adjusting mechanism includes a piezoelectric transducer.

20. The device according to claim 19, said piezoelectric transducer moving said electro-developing recording medium in a direction transverse to a direction of movement of said electro-developing recording medium by said positioning mechanism.

* * * * *